United States Patent
Sokun et al.

(10) Patent No.: US 12,512,922 B2
(45) Date of Patent: Dec. 30, 2025

(54) DEEP LEARNING-BASED USER CLUSTERING IN MILLIMETER WAVE NON-ORTHOGONAL MULTIPLE ACCESS COMMUNICATIONS

(71) Applicant: Telefonaktiebolaget LM Ericsson (publ), Stockholm (SE)

(72) Inventors: Hamza Sokun, Ottawa (CA); Aditya Sriram Rajasekaran, Ottawa (CA); Omar Maraqa, Dhahran (SA); Halim Yanikomeroglu, Ottawa (CA); Saad Al-Ahmadi, Dhahran (SA)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 397 days.

(21) Appl. No.: 18/256,467

(22) PCT Filed: Dec. 28, 2020

(86) PCT No.: PCT/IB2020/062488
§ 371 (c)(1),
(2) Date: Jun. 8, 2023

(87) PCT Pub. No.: WO2022/144568
PCT Pub. Date: Jul. 7, 2022

(65) Prior Publication Data
US 2024/0072923 A1  Feb. 29, 2024

(51) Int. Cl.
*H04J 11/00* (2006.01)
*G01S 7/41* (2006.01)
*H04L 25/02* (2006.01)

(52) U.S. Cl.
CPC ........ *H04J 11/0043* (2013.01); *G01S 7/417* (2013.01); *H04L 25/0202* (2013.01)

(58) Field of Classification Search
CPC ... H04J 11/0043; G01S 7/417; H04L 25/0202
See application file for complete search history.

(56) References Cited

U.S. PATENT DOCUMENTS

| | | | | |
|---|---|---|---|---|
| 2016/0182397 A1* | 6/2016 | Mcfarlin | ............... | H04L 47/78 709/226 |
| 2019/0020435 A1* | 1/2019 | Nishimoto | ........... | H04J 11/0036 |

(Continued)

FOREIGN PATENT DOCUMENTS

WO     2020/064999 A1     4/2020

OTHER PUBLICATIONS

International Search Report and Written Opinion dated Sep. 3, 2021 issued in PCT Application No. PCT/IB2020/062488 filed Dec. 28, 2020, consisting of 16 pages.

(Continued)

*Primary Examiner* — Hashim S Bhatti
(74) *Attorney, Agent, or Firm* — Weisberg I.P. Law, P.A.

(57) ABSTRACT

A method and network node for deep learning based user clustering in millimeter wave (mmWave) non-orthogonal multiple access (NOMA) are disclosed. According to one aspect, a method includes determining a minimum number of clusters to be served by the network node subject to a first constraint that limits a total number of WDs in each cluster. The method also includes assigning WDs to each cluster of the minimum number of clusters while or after the minimum number of clusters is determined, the determined minimum number of clusters and WD assignments being for a first spatial distribution of the plurality of WDs.

20 Claims, 4 Drawing Sheets

(56) References Cited

U.S. PATENT DOCUMENTS

2022/0159586 A1\* 5/2022 Choi ................... H04W 52/143
2023/0412220 A1\* 12/2023 Kiani ................... H04B 7/0626

OTHER PUBLICATIONS

Rajasekaran, et al., User Clustering in mmWave-NOMA Systems With User Decoding Capability Constraints for B5G Networks; IEEE Access, Nov. 19, 2020, consisting of 15 pages.
Cui, et al., Unsupervised Machine Learning-Based User Clustering in Millimeter-Wave-NOMA Systems; IEEE Transactions on Wireless Communications, vol. 17, No. 11, Nov. 2018, consisting of 16 pages.
Ding et al., NOMA Meets Finite Resolution Analog Beamforming in Massive MIMO and Millimeter-Wave Networks; IEEE Communications letters, vol. 21, No. 8, Aug. 2017, consisting of 4 pages.
Zhu et al., Joint Tx-Rx Beamforming and Power Allocation for 5G Millimeter-Wave Non-Orthogonal Multiple Access (MmWave-NOMA) Networks; IEEE Transactions on Communications; Nov. 2018, consisting of 11 pages.
Marasinghe et al., Hierarchical User Clustering for mmWave-NOMA Systems; 2020 2nd 6G Wireless Summit (6G Summit), IEEE; Feb. 18, 2020, consisting of 5 pages.
Xu et al., Survey of Clustering Algorithms, IEEE Transactions on Neural Networks, vol. 16, No. 3, May 2005, consisting of 34 pages.
Sanguinetti et al., Deep Learning Power Allocation in Massive MIMO; 2018 52nd Asilomar Conference on Signals, Systems, and Computers; IEEE Jun. 3, 2019, consisting of 5 pages.
Gündüz et al., Machine Learning in the Air, IEEE Journal on Selected Areas in Communications; Apr. 28, 2019, consisting of 17 pages.
Conforti et al., Integer Programming; Graduate Texts in Mathematics 271, GTM, Berlin, Springer; 2014, consisting pf 466 pages.
Saglam, A Mixed-Integer Programming Approach to the Clustering Problem with an Application in Customer Segmentation, European Journal of Operational Research; Jul. 2005, consisting of 98 pages.
Ye, An Integer Programming Clustering Approach with Application to Recommendation Systems; Iowa State University Capstones, Theses and Dissertations; 2007, consisting of 54 pages.

\* cited by examiner

DEEP LEARNING-BASED USER CLUSTERING IN MILLIMETER WAVE NON-ORTHOGONAL MULTIPLE ACCESS COMMUNICATIONS

CROSS-REFERENCE TO RELATED APPLICATIONS

This application is a Submission Under 35 U.S.C. § 371 for U.S. National Stage Patent Application of International Application Number: PCT/IB2020/062488, filed Dec. 28, 2020 entitled "DEEP LEARNING-BASED USER CLUSTERING IN MILLIMETER WAVE NON-ORTHOGONAL MULTIPLE ACCESS COMMUNICATIONS," the entirety of which is incorporated herein by reference.

TECHNICAL FIELD

This disclosure relates to wireless communication and in particular, to deep learning based user clustering in millimeter wave (mmWave) non-orthogonal multiple access (NOMA) communications.

BACKGROUND

The Third Generation Partnership Project (3GPP) has developed and is developing standards for Fourth Generation (4G) (also referred to as Long Term Evolution (LTE)) and Fifth Generation (5G) (also referred to as New Radio (NR)) wireless communication systems. Such systems provide, among other features, broadband communication between network nodes, such as base stations, and mobile wireless devices (WD), as well as communication between network nodes and between WDs.

5G networks and networks beyond 5G seek to provide higher data rates with lower transmission latency. To realize these goals, larger bandwidths than what are being used today may be required. Larger bandwidths imply higher frequencies. Regions of the available spectrum may be used, in addition to the traditional spectrum below 6 GHz. For example, 5G wireless networks use the frequency spectrum in the mmWave range of 30-300 GHz to add more bandwidth. However, mmWave communications suffer from the increased pathloss at higher frequencies. To overcome this difficulty, large antenna arrays with beamforming have been used in order to boost antenna gain.

There are mainly three different beamforming techniques: 1) Analog beamforming (ABF); 2) Digital beamforming (DBF); 3) Hybrid Beamforming (HBF). Among these techniques, ABF is the one which requires the least hardware cost and energy consumption; however, ABF has its own limitations. For instance, in ABF, there is only one RF chain which is shared by all the antennas. The single RF chain can only serve one user in one time slot in mmWave communications with the conventional orthogonal multiple access (OMA). Of course, this limitation presents a major challenge to the promise of 5G massive connectivity.

To serve multiple users simultaneously when using ABF for mmWave communications, non-orthogonal multiple access (NOMA) can be utilized. In NOMA, multiple users can be served by the same wireless resource by exploiting power, code or other domains for multiplexing. Particularly, using NOMA, the signals for a plurality of WDs are superimposed prior to transmission by the network node (such as an NR base station, gNB). Later, an interference cancellation technique, such as successive interference cancellation (SIC), is applied by a WD to decode the signals successively until the desired signal is obtained.

In mmWave communications, the use of high-gain antennas enables highly directional transmission paths and also results in strongly correlated user channels. This is beneficial for realization of NOMA in mmWave networks as the users who have a correlated channel can be clustered together. In ABF-based mmWave NOMA networks, a single beam is used to serve a cluster of users with the correlated channels at a particular time slot, and the users of this cluster are multiplexed in power or code or other domains. Network performance is affected by how WDs are clustered. Finding the optimal clustering to maximize performance is a formidable task for large networks. However, solutions are possible using machine learning (ML) techniques.

Different ML techniques have been considered for finding "good" user clusters. For instance, some researchers have used a heuristic K-means user clustering algorithm based on the cosine similarity of users' channel vectors. Despite being arguably the simplest approach, there are disadvantages to using this algorithm: 1) it requires knowledge of the number of clusters beforehand. To determine the choice of the number of clusters, a heuristic elbow method has been considered. However, this method requires running the K-means algorithm multiple times and to use visual support; and 2) The initial cluster centroids are selected randomly. Different initial centroids can result in different final clusters.

Another heuristic approach is one based on a hierarchical algorithm. An advantage of this approach is that there is no need to specify the number of the clusters as an input. However, its major weakness is being unable to scale well; higher time complexity compared to a K-means algorithm.

In the mmWave-NOMA literature, the existing ML solutions widely use unsupervised learning techniques for user clustering, either K-means or hierarchical clustering algorithms. Some disadvantages of these techniques are discussed above. However, there is one additional problem-specific limitation with these unsupervised learning approaches. This additional limitation is being unable to incorporate practical constraints, such as constraints pertaining to a WD's SIC decoding capabilities. Additional problems may include addressing a channel gain discrepancy of cluster members and beam coverage shapes in case of using a fixed set of beams, and so on.

For instance, in practice, NOMA WDs cannot perform SIC to decode an infinite number of other WDs' signals due to the limited computational, energy and memory resources of the WDs.

SUMMARY

Some embodiments advantageously provide a method and system for deep learning based user clustering in millimeter wave (mmWave) non-orthogonal multiple access (NOMA).

Existing solutions are unaware of the WDs' SIC decoding capabilities while constructing the NOMA clusters. These solutions all assume that there is no cap at all on the number of users within clusters, which is impractical. Some embodiments are configured to take into account WD SIC decoding capabilities when constructing NOMA clusters.

This disclosure focusses on the user clustering problem in power-domain NOMA. To bridge the divide between theoretical design and practical implementation of user clustering algorithms for mmWave NOMA networks, a two-stage approach is adopted. The two stage approach incorporates practical concerns into user cluster formation. In some embodiments, in a first step, a mathematical optimization model is developed for user clustering. This model minimizes the number of clusters in the network subject to practical design constraints such as SIC decoding capability per cluster. Noting that in case of using analog beamforming (ABF) for mmWave NOMA, minimizing the number of clusters in a cell will maximize the number of users that can be served over the same transmission resource.

The model is initially formulated as an integer nonlinear programming problem, which is highly non-convex, and then, the formulation is linearized without increasing the size of the formulation. Later, the resulting formulation is solved offline by traditional means of optimization for different realizations of WD positions and for constraint-related parameters. In this way, a labeled training set is generated to be used by a supervised learning technique.

In a second step, a deep learning technique is utilized to learn the unknown map between the inputs (WD positions and the constraint related parameters) and the output (optimal/close-to-optimal user clustering policy). A deep neural network is trained on the data set obtained in the previous stage, and then, used to predict user clusters for a new set of WD positions and the constraints related parameters. Every time the WDs change their positions in the network, the user-to-cluster assignment may be updated by feeding the new WD positions and the constraints related parameters to the deep neural network. Geographical location information of WDs is used as an input, as opposed to using knowledge of average channel gains and average interference gains as a proxy for obtaining the optimal/suboptimal powers, because the geographical location of the WDs the already account for the main feature of the propagation channels and interference in the network.

Some advantages of some embodiments of a two-stage supervised machine learning-based NOMA clustering algorithm can be summarized as follows:

1) A new optimization framework is introduced for joint optimization of finding the number of NOMA clusters and determining user-to-cluster assignments. Hence, there is no need to specify the number of the clusters as input.

2) This framework can accommodate the practical constraints, such as successive interference cancellation (SIC) decoding capabilities.

3) It is shown that the formulated user clustering problem is an integer nonlinear program which is highly non-convex and difficult to tackle directly. Hence, a new transformation is introduced to reformulate the optimization problem as an integer linear program which can be solved by standard optimization techniques.

4) Note that global optimization techniques often have high computational complexity. So, they can be prohibitively complex for practical implementation. However, this complexity can be taken offline by training a deep neural network to learn input-output behavior of the optimization problem. First, the optimization problem may be solved offline to obtain the user-to-cluster assignments for different realizations of the positions of a plurality of the WDs, and the constraints related parameters. Later, these input-output pairs are utilized to train the deep neural network. At run time, the inputs may be passed through the trained deep neural network, which can be far cheaper than running a non-convex optimization algorithm online.

According to one aspect, a network node configured to communicate with a plurality of wireless devices, WDs, via nonorthogonal multiple access (NOMA) is provided. The network node includes processing circuitry configured to: determine a minimum number of clusters to be served by the network node subject to a first constraint that limits a total number of WDs in each cluster. The processing circuitry is also configured to assign WDs to each cluster of the minimum number of clusters while or after the minimum number of clusters is determined, the determined minimum number of clusters and WD assignments being for a first spatial distribution of the plurality of WDs.

According to this aspect, in some embodiments, determining the minimum number of clusters is further subject to a second constraint that includes a first WD in a cluster based at least in part on a measure of channel similarity with other WDs in the cluster. In some embodiments, the second constraint is linearized. In some embodiments, the measure of channel similarity is based at least in part on a gain of a line of sight, LOS, component of a channel vector of a channel between the network node and the first WD. In some embodiments, the measure of channel similarity is a cosine similarity metric that is based at least in part on a normalized scalar product of channel vectors. In some embodiments, the measure of channel similarity associated with the first WD is based at least in part on a magnitude of a difference between normalized channel vectors. In some embodiments, the first constraint is based at least in part on an upper limit on successive interference cancellation, SIC, iterations to be performed by at least one WD in a cluster. In some embodiments, the processing circuitry is further configured to: minimize, for each of a plurality of hypothetical spatial distributions of the plurality of WDs, a number of clusters to be served by the network node subject to at least a third constraint that limits a total number of WDs in each cluster; determine a model based at least in part on the first spatial distribution of the plurality of WDs and the plurality of hypothetical spatial distributions of the plurality of WDs, the model configured to receive as inputs a set of WD positions and to produce as outputs a minimum number of clusters and a set of WD assignments for each cluster of the minimum number of clusters; and apply the model to a set of current WD positions of the plurality of WDs to: determine a first minimum number of clusters for the set of current WD positions; and determine which WDs are in each cluster in the determined first minimum number of clusters. In some embodiments, the determination of the model is made by a deep neural network that learns by offline processing to minimize a number of clusters for a given set of WDs positions. In some embodiments, the processing circuitry is further configured to allocate different resources to different clusters of the determined first minimum number of clusters.

According to another aspect, a method in a network node configured to communicate with a plurality of wireless devices, WDs, via nonorthogonal multiple access (NOMA) is provided. The method includes determining a minimum number of clusters to be served by the network node subject to a first constraint that limits a total number of WDs in each cluster. The method also includes assigning WDs to each cluster of the minimum number of clusters while or after the minimum number of clusters is determined, the determined minimum number of clusters and WD assignments being for a first spatial distribution of the plurality of WDs.

According to this aspect, in some embodiments, determining the minimum number of clusters is further subject to a second constraint that includes a first WD in a cluster based at least in part on a measure of channel similarity with other WDs in the cluster. In some embodiments, the second constraint is linearized. In some embodiments, the measure of channel similarity is based at least in part on a gain of a line of sight, LOS, component of a channel vector of a channel between the network node and the first WD. In some embodiments, the measure of channel similarity is a cosine similarity metric that is based at least in part on a normalized scalar product of channel vectors. In some embodiments, the measure of channel similarity associated with the first WD is based at least in part on a magnitude of a difference between normalized channel vectors. In some embodiments, the first constraint is based at least in part on an upper limit on successive interference cancellation, SIC, iterations to be performed by at least one WD in a cluster. In some embodiments, the method further includes minimizing, for each of a plurality of hypothetical spatial distributions of the plurality of WDs, a number of clusters to be served by the network node subject to at least a third constraint that limits a total number of WDs in each cluster. The method also includes determining a model based at least in part on the first spatial distribution of the plurality of WDs and the plurality of hypothetical spatial distributions of the plurality of WDs, the model configured to receive as inputs a set of WD positions and to produce as outputs a minimum number of clusters and a set of WD assignments for each cluster of the minimum number of clusters. The method also includes applying the model to a set of current WD positions of the plurality of WDs to: determine a first minimum number of clusters for the set of current WD positions; and determine which WDs are in each cluster in the determined first minimum number of clusters. In some embodiments, the determination of the model is made by a deep neural network that learns by offline processing to minimize a number of clusters for a given set of WDs positions. In some embodiments, the method further includes allocating different resources to different clusters of the determined first minimum number of clusters.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein:

FIG. 3 is a diagram of a plurality of clusters of WDs served by a network node; and.

DETAILED DESCRIPTION

Before describing in detail exemplary embodiments, it is noted that the embodiments reside primarily in combinations of apparatus components and processing steps related to deep learning based user clustering in millimeter wave (mmWave) non-orthogonal multiple access (NOMA). Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein. Like numbers refer to like elements throughout the description.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

The term "network node" used herein can be any kind of network node comprised in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), integrated access and backhaul (IAB) node, relay node, donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment. The term "radio node" used herein may be used to also denote a wireless device (WD) such as a wireless device (WD) or a radio network node.

In some embodiments, the non-limiting terms wireless device (WD) or a user equipment (UE) are used interchangeably. The WD herein can be any type of wireless device capable of communicating with a network node or another WD over radio signals, such as wireless device (WD). The WD may also be a radio communication device, target device, device to device (D2D) WD, machine type WD or WD capable of machine to machine communication (M2M), low-cost and/or low-complexity WD, a sensor equipped with WD, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IOT) device, etc.

Also, in some embodiments the generic term "radio network node" is used. It can be any kind of a radio network node which may comprise any of base station, radio base station, base transceiver station, base station controller, network controller, RNC, evolved Node B (eNB), Node B, gNB, Multi-cell/multicast Coordination Entity (MCE), IAB node, relay node, access point, radio access point, Remote Radio Unit (RRU) Remote Radio Head (RRH).

Note that although terminology from one particular wireless system, such as, for example, 3GPP LTE and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

Note further, that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

In some embodiments, deep learning based user clustering in millimeter wave (mmWave) non-orthogonal multiple access (NOMA) is provided.

Figure 1:
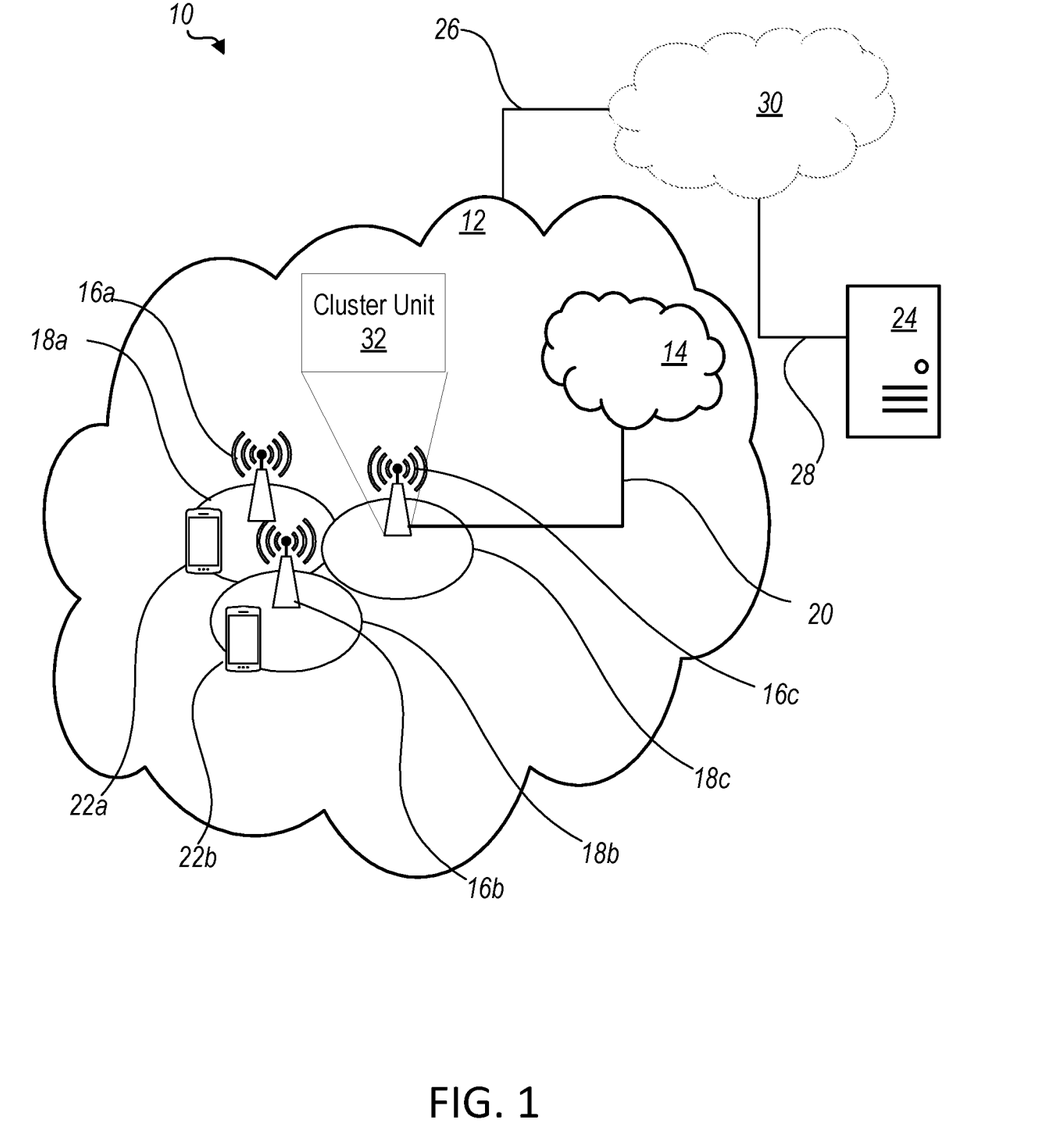
FIG. 1 is a schematic diagram of an exemplary network architecture illustrating a communication system connected via an intermediate network to a host computer according to the principles in the present disclosure.

Referring now to the drawing figures, in which like elements are referred to by like reference numerals, there is shown in FIG. 1 a schematic diagram of a communication system 10, according to an embodiment, such as a 3GPP-type cellular network that may support standards such as LTE and/or NR (5G), which comprises an access network 12, such as a radio access network, and a core network 14. The access network 12 comprises a plurality of network nodes 16a, 16b, 16c (referred to collectively as network nodes 16), such as NBs, eNBs, gNBs or other types of wireless access points, each defining a corresponding coverage area 18a, 18b, 18c (referred to collectively as coverage areas 18). Each network node 16a, 16b, 16c is connectable to the core network 14 over a wired or wireless connection 20. A first wireless device (WD) 22a located in coverage area 18a is configured to wirelessly connect to, or be paged by, the corresponding network node 16a. A second WD 22b in coverage area 18b is wirelessly connectable to the corresponding network node 16b. While a plurality of WDs 22a, 22b (collectively referred to as wireless devices 22) are illustrated in this example, the disclosed embodiments are equally applicable to a situation where a sole WD is in the coverage area or where a sole WD is connecting to the corresponding network node 16. Note that although only two WDs 22 and three network nodes 16 are shown for convenience, the communication system may include many more WDs 22 and network nodes 16.

Also, it is contemplated that a WD 22 can be in simultaneous communication and/or configured to separately communicate with more than one network node 16 and more than one type of network node 16. For example, a WD 22 can have dual connectivity with a network node 16 that supports LTE and the same or a different network node 16 that supports NR. As an example, WD 22 can be in communication with an eNB for LTE/E-UTRAN and a gNB for NR/NG-RAN.

The communication system 10 may itself be connected to a host computer 24, which may be embodied in the hardware and/or software of a standalone server, a cloud-implemented server, a distributed server or as processing resources in a server farm. The host computer 24 may be under the ownership or control of a service provider, or may be operated by the service provider or on behalf of the service provider. The connections 26, 28 between the communication system 10 and the host computer 24 may extend directly from the core network 14 to the host computer 24 or may extend via an optional intermediate network 30. The intermediate network 30 may be one of, or a combination of more than one of, a public, private or hosted network. The intermediate network 30, if any, may be a backbone network or the Internet. In some embodiments, the intermediate network 30 may comprise two or more sub-networks (not shown).

The communication system of FIG. 1 as a whole enables connectivity between one of the connected WDs 22a, 22b and the host computer 24. The connectivity may be described as an over-the-top (OTT) connection. The host computer 24 and the connected WDs 22a, 22b are configured to communicate data and/or signaling via the OTT connection, using the access network 12, the core network 14, any intermediate network 30 and possible further infrastructure (not shown) as intermediaries. The OTT connection may be transparent in the sense that at least some of the participating communication devices through which the OTT connection passes are unaware of routing of uplink and downlink communications. For example, a network node 16 may not or need not be informed about the past routing of an incoming downlink communication with data originating from a host computer 24 to be forwarded (e.g., handed over) to a connected WD 22a. Similarly, the network node 16 need not be aware of the future routing of an outgoing uplink communication originating from the WD 22a towards the host computer 24.

A network node 16 is configured to include a cluster unit 32 that is configured to determine a minimum number of clusters to be served by the network node subject to a first constraint that limits a total number of WDs in each cluster. The cluster unit 32 is also configured to assign WDs to each cluster of the minimum number of clusters while or after the minimum number of clusters is determined, the determined minimum number of clusters and WD assignments being for a first spatial distribution of the plurality of WDs.

Example implementations, in accordance with an embodiment, of the WD 22, network node 16 and host computer 24 discussed in the preceding paragraphs will now be described with reference to FIG. 2. In a communication system 10, a host computer 24 comprises hardware (HW) 38 including a communication interface 40 configured to set up and maintain a wired or wireless connection with an interface of a different communication device of the communication system 10. The host computer 24 further comprises processing circuitry 42, which may have storage and/or processing capabilities. The processing circuitry 42 may include a processor 44 and memory 46. In particular, in addition to or instead of a processor, such as a central processing unit, and memory, the processing circuitry 42 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 44 may be configured to access (e.g., write to and/or read from) memory 46, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Processing circuitry 42 may be configured to control any of the methods and/or processes described herein and/or to cause such methods, and/or processes to be performed, e.g., by host computer 24. Processor 44 corresponds to one or more processors 44 for performing host computer 24 functions described herein. The host computer 24 includes memory 46 that is configured to store data, programmatic software code and/or other information described herein. In some embodiments, the software 48 and/or the host application 50 may include instructions that, when executed by the processor 44 and/or processing circuitry 42, causes the processor 44 and/or processing circuitry 42 to perform the processes described herein with respect to host computer 24. The instructions may be software associated with the host computer 24.

The software 48 may be executable by the processing circuitry 42. The software 48 includes a host application 50. The host application 50 may be operable to provide a service to a remote user, such as a WD 22 connecting via an OTT connection 52 terminating at the WD 22 and the host computer 24. In providing the service to the remote user, the host application 50 may provide user data which is transmitted using the OTT connection 52. The "user data" may be data and information described herein as implementing the described functionality. In one embodiment, the host computer 24 may be configured for providing control and functionality to a service provider and may be operated by the service provider or on behalf of the service provider. The processing circuitry 42 of the host computer 24 may enable the host computer 24 to observe, monitor, control, transmit to and/or receive from the network node 16 and or the wireless device 22.

The communication system 10 further includes a network node 16 provided in a communication system 10 and including hardware 58 enabling it to communicate with the host computer 24 and with the WD 22. The hardware 58 may include a communication interface 60 for setting up and maintaining a wired or wireless connection with an interface of a different communication device of the communication system 10, as well as a radio interface 62 for setting up and maintaining at least a wireless connection 64 with a WD 22 located in a coverage area 18 served by the network node 16. The radio interface 62 may be formed as or may include, for example, one or more RF transmitters, one or more RF receivers, and/or one or more RF transceivers. The radio interface 62 further includes a set of antennas 63, such as a phased array of antennas 63. The communication interface 60 may be configured to facilitate a connection 66 to the host computer 24. The connection 66 may be direct or it may pass through a core network 14 of the communication system and/or through one or more intermediate networks 30 outside the communication system 10.

In the embodiment shown, the hardware 58 of the network node 16 further includes processing circuitry 68. The processing circuitry 68 may include a processor 70 and a memory 72. In particular, in addition to or instead of a processor, such as a central processing unit, and memory, the processing circuitry 68 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 70 may be configured to access (e.g., write to and/or read from) the memory 72, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the network node 16 further has software 74 stored internally in, for example, memory 72, or stored in external memory (e.g., database, storage array, network storage device, etc.) accessible by the network node 16 via an external connection. The software 74 may be executable by the processing circuitry 68. The processing circuitry 68 may be configured to control any of the methods and/or processes described herein and/or to cause such methods, and/or processes to be performed, e.g., by network node 16. Processor 70 corresponds to one or more processors 70 for performing network node 16 functions described herein. The memory 72 is configured to store data, programmatic software code and/or other information described herein. In some embodiments, the software 74 may include instructions that, when executed by the processor 70 and/or processing circuitry 68, causes the processor 70 and/or processing circuitry 68 to perform the processes described herein with respect to network node 16. For example, processing circuitry 68 of the network node 16 may include a cluster unit 32 that is configured to determine a minimum number of clusters to be served by the network node subject to a first constraint that limits a total number of WDs in each cluster. The cluster unit 32 is also configured to assign WDs to each cluster of the minimum number of clusters while or after the minimum number of clusters is determined, the determined minimum number of clusters and WD assignments being for a first spatial distribution of the plurality of WDs.

The communication system 10 further includes the WD 22 already referred to. The WD 22 may have hardware 80 that may include a radio interface 82 configured to set up and maintain a wireless connection 64 with a network node 16 serving a coverage area 18 in which the WD 22 is currently located. The radio interface 82 may be formed as or may include, for example, one or more RF transmitters, one or more RF receivers, and/or one or more RF transceivers.

The hardware 80 of the WD 22 further includes processing circuitry 84. The processing circuitry 84 may include a processor 86 and memory 88. In particular, in addition to or instead of a processor, such as a central processing unit, and memory, the processing circuitry 84 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 86 may be configured to access (e.g., write to and/or read from) memory 88, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the WD 22 may further comprise software 90, which is stored in, for example, memory 88 at the WD 22, or stored in external memory (e.g., database, storage array, network storage device, etc.) accessible by the WD 22. The software 90 may be executable by the processing circuitry 84. The software 90 may include a client application 92. The client application 92 may be operable to provide a service to a human or non-human user via the WD 22, with the support of the host computer 24. In the host computer 24, an executing host application 50 may communicate with the executing client application 92 via the OTT connection 52 terminating at the WD 22 and the host computer 24. In providing the service to the user, the client application 92 may receive request data from the host application 50 and provide user data in response to the request data. The OTT connection 52 may transfer both the request data and the user data. The client application 92 may interact with the user to generate the user data that it provides.

The processing circuitry 84 may be configured to control any of the methods and/or processes described herein and/or to cause such methods, and/or processes to be performed, e.g., by WD 22. The processor 86 corresponds to one or more processors 86 for performing WD 22 functions described herein. The WD 22 includes memory 88 that is configured to store data, programmatic software code and/or other information described herein. In some embodiments, the software 90 and/or the client application 92 may include instructions that, when executed by the processor 86 and/or processing circuitry 84, causes the processor 86 and/or processing circuitry 84 to perform the processes described herein with respect to WD 22.

Figure 2:
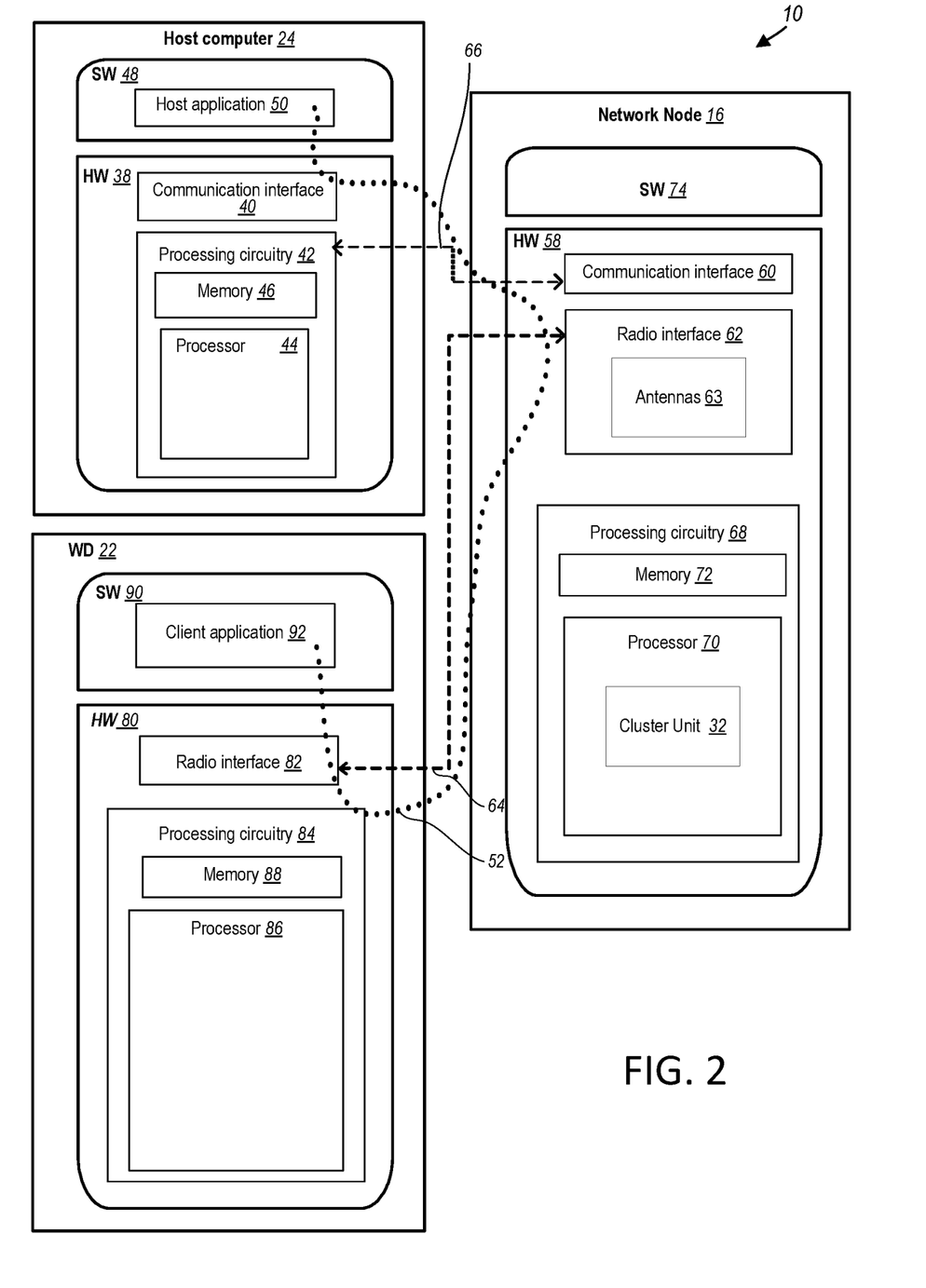
FIG. 2 is a block diagram of a host computer communicating via a network node with a wireless device over an at least partially wireless connection according to some embodiments of the present disclosure.

In some embodiments, the inner workings of the network node 16, WD 22, and host computer 24 may be as shown in FIG. 2 and independently, the surrounding network topology may be that of FIG. 1.

In FIG. 2, the OTT connection 52 has been drawn abstractly to illustrate the communication between the host computer 24 and the wireless device 22 via the network node 16, without explicit reference to any intermediary devices and the precise routing of messages via these devices. Network infrastructure may determine the routing, which it may be configured to hide from the WD 22 or from the service provider operating the host computer 24, or both. While the OTT connection 52 is active, the network infrastructure may further take decisions by which it dynamically changes the routing (e.g., on the basis of load balancing consideration or reconfiguration of the network).

The wireless connection 64 between the WD 22 and the network node 16 is in accordance with the teachings of the embodiments described throughout this disclosure. One or more of the various embodiments improve the performance of OTT services provided to the WD 22 using the OTT connection 52, in which the wireless connection 64 may form the last segment. More precisely, the teachings of some of these embodiments may improve the data rate, latency, and/or power consumption and thereby provide benefits such as reduced user waiting time, relaxed restriction on file size, better responsiveness, extended battery lifetime, etc.

In some embodiments, a measurement procedure may be provided for the purpose of monitoring data rate, latency and other factors on which the one or more embodiments improve. There may further be an optional network functionality for reconfiguring the OTT connection 52 between the host computer 24 and WD 22, in response to variations in the measurement results. The measurement procedure and/or the network functionality for reconfiguring the OTT connection 52 may be implemented in the software 48 of the host computer 24 or in the software 90 of the WD 22, or both. In embodiments, sensors (not shown) may be deployed in or in association with communication devices through which the OTT connection 52 passes; the sensors may participate in the measurement procedure by supplying values of the monitored quantities exemplified above, or supplying values of other physical quantities from which software 48, 90 may compute or estimate the monitored quantities. The reconfiguring of the OTT connection 52 may include message format, retransmission settings, preferred routing etc.; the reconfiguring need not affect the network node 16, and it may be unknown or imperceptible to the network node 16. Some such procedures and functionalities may be known and practiced in the art. In certain embodiments, measurements may involve proprietary WD signaling facilitating the host computer's 24 measurements of throughput, propagation times, latency and the like. In some embodiments, the measurements may be implemented in that the software 48, 90 causes messages to be transmitted, in particular empty or 'dummy' messages, using the OTT connection 52 while it monitors propagation times, errors, etc.

Thus, in some embodiments, the host computer 24 includes processing circuitry 42 configured to provide user data and a communication interface 40 that is configured to forward the user data to a cellular network for transmission to the WD 22. In some embodiments, the cellular network also includes the network node 16 with a radio interface 62. In some embodiments, the network node 16 is configured to, and/or the network node's 16 processing circuitry 68 is configured to perform the functions and/or methods described herein for preparing/initiating/maintaining/supporting/ending a transmission to the WD 22, and/or preparing/terminating/maintaining/supporting/ending in receipt of a transmission from the WD 22.

In some embodiments, the host computer 24 includes processing circuitry 42 and a communication interface 40 that is configured to a communication interface 40 configured to receive user data originating from a transmission from a WD 22 to a network node 16. In some embodiments, the WD 22 is configured to, and/or comprises a radio interface 82 and/or processing circuitry 84 configured to perform the functions and/or methods described herein for preparing/initiating/maintaining/supporting/ending a transmission to the network node 16, and/or preparing/terminating/maintaining/supporting/ending in receipt of a transmission from the network node 16.

Although FIGS. 1 and 2 show various "units" such as cluster unit 32 as being within a respective processor, it is contemplated that these units may be implemented such that a portion of the unit is stored in a corresponding memory within the processing circuitry. In other words, the units may be implemented in hardware or in a combination of hardware and software within the processing circuitry.

Having described the general process flow of arrangements of the disclosure and having provided examples of hardware and software arrangements for implementing the processes and functions of the disclosure, the sections below provide details and examples of arrangements for learning based user clustering in millimeter wave (mmWave) non-orthogonal multiple access (NOMA) communications.

Figure 3:
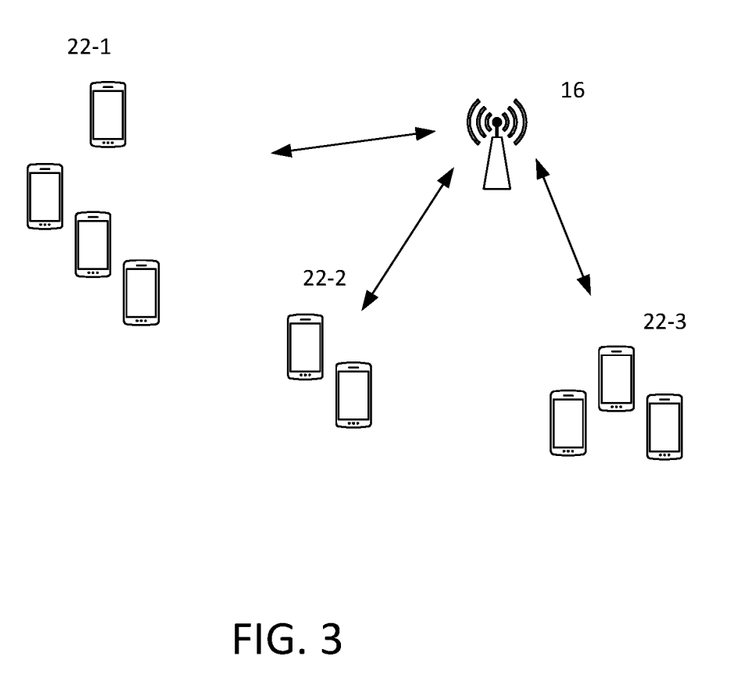

FIG. 3 shows an example network node 16 serving three different clusters of WDs 22, namely cluster 22-1, cluster 22-2 and cluster 22-3. Although three clusters are shown as an example, a fewer or greater number of clusters may be served by the network node 16. Also, more or fewer than two WDs 22 may be in a cluster. Further, some clusters may be closer together than others. In other words, the quantities and relationships of WDs 22 and clusters 22-x are examples and should not be construed to be limiting.

Figure 4:
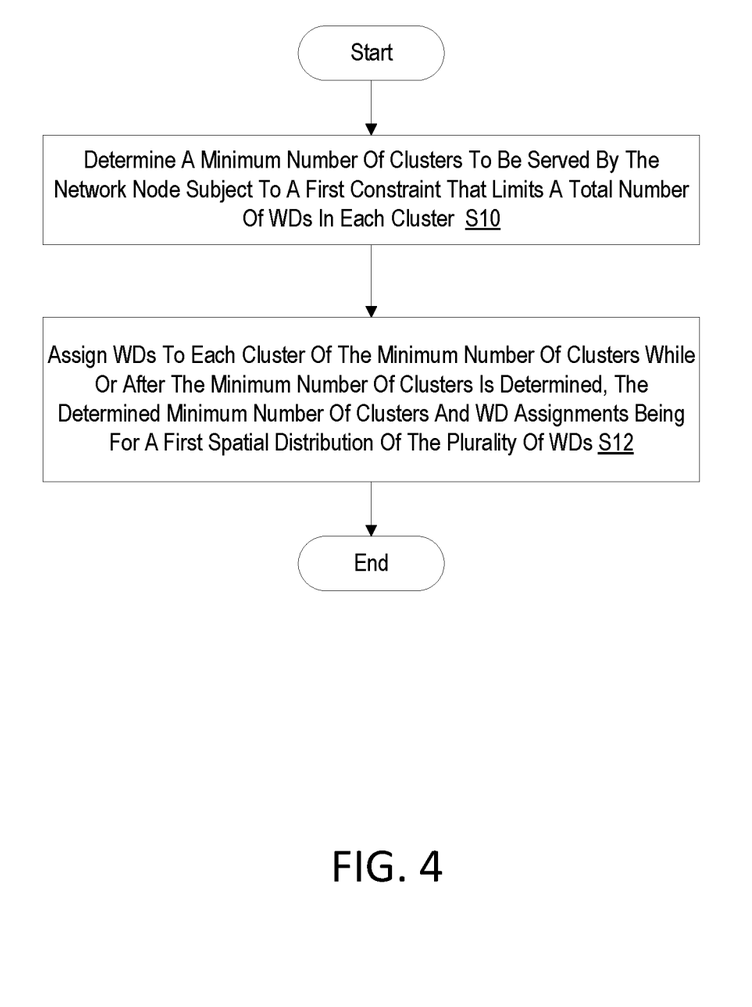
FIG. 4 is a flowchart of an example process for cluster formation according to principles set forth herein.

FIG. 4 is a flowchart of an example process for cluster formation by a network node 16 according to principles set forth herein. One or more blocks described herein may be performed by one or more elements of network node 16 such as by one or more of the processing circuitry 68 and processor 70, including the cluster unit 32, and/or the radio interface 62 and/or the communication interface 60. Network node 16 such as via processing circuitry 68 and/or processor 70 and/or radio interface 62 and/or communication interface 60 is configured to determine a minimum number of clusters to be served by the network node subject to a first constraint that limits a total number of WDs 22 in each cluster (Block S10). The process also includes assigning WDs 22 to each cluster of the minimum number of clusters while or after the minimum number of clusters is determined, the determined minimum number of clusters and WD assignments being for a first spatial distribution of the plurality of WDs 22 (Block S12).

Having described the general process flow of arrangements of the disclosure and having provided examples of hardware and software arrangements for implementing the processes and functions of the disclosure, the sections below provide details and examples of arrangements for deep learning based user clustering in millimeter wave (mmWave) non-orthogonal multiple access (NOMA).

Consider a downlink mmWave-NOMA system with a single network node 16, such as a gNB, equipped with M-antenna phased arrays and one radio frequency (RF) chain serving N single-antenna users (WDs), such as shown in FIG. 3.

In the network node 16, each antenna of the antennas 63 may be driven by a phase shifter and a power amplifier. Due to the requirement of low power consumption and hardware cost, an analog beamforming structure with one RF chain that utilizes the single-phase shifter implementation is presented. However, in other embodiments, a digital or hybrid beamforming structure and multiple phase-shifter implementation may be implemented with NOMA according to principles disclosed herein. In the ABF NOMA scheme, the network node 16 chooses n users among the N users in the cell to form a NOMA cluster. The remaining users can be grouped into multiple other clusters.

For mathematical convenience, consider first, signaling within one NOMA cluster (e.g., cluster-k). Then, remaining clusters can be analyzed. For the network node 16 to serve the users of cluster-k, the BS broadcasts s k independent superposed data streams to the selected users in the cluster-k using superposition coding (SC). The SC data streams can be expressed as $$s_k = w_k \sqrt{p_k} s_k = w_k \sqrt{p_k} \sum_{i=1}^{n_k} \sqrt{\beta_{k,i}} s_{k,i}, \qquad (1)$$

where $w_k \in \mathbb{C}^{M \times 1}$ is the analog beamforming vector (i.e., the antenna weight vector (AWV)) that is formed at the network node 16 to serve the users in the k-th cluster. $n_k$ represents the set of users that belongs to cluster k. $\sum_{i=1}^{n_k} \sqrt{\beta_{k,i}} s_{k,i}$ is the superposed messages sent to the users in cluster k, where $\beta = [\beta_{k,1}, \beta_{k,2}, \ldots, \beta_{k,n_k}]^T$ is the power allocation coefficients for the users in the k-th NOMA cluster with $\sum_{i=1}^{n_k} \sqrt{\beta_{k,i}} = 1$. $p_k$ is the network node 16 power portion that is allocated to the k-th cluster out of the different clusters with $P = [p_1, p_2, \ldots, p_K]^T$ and $\sum_{k \in K} p_k = P_t$. P t denotes the network node 16 total transmission power. The received signal at an arbitrary user-i that is located at cluster-k is:

$$y_i = h_{k,i}^H \sqrt{p_k} s_k + v_i, \qquad (2)$$

$$= h_{k,i}^H w_k \sqrt{p_k} s_k + v_i,$$

$$= \underbrace{h_{k,i}^H w_k \sqrt{p_k} \sqrt{\beta_{k,i}} s_{k,i}}_{\text{Desired Signal}} + \underbrace{h_{k,i}^H w_k \sqrt{p_k} \sum_{j=1, j \neq i}^{n_k} \sqrt{\beta_{k,j}} s_{k,j}}_{\text{Intra-cluster Interference}} + \underbrace{v_i}_{\text{Noise}},$$

where $h_{k,i}^H \in \mathbb{C}^{M \times 1}$ is the mmWave channel vector between the network node 16 and the user-i at cluster-k and the superscript H denotes the Hermitian transpose. Assume that the network node 16 has the perfect CSI of all users. $v_i \sim CN(0, \sigma_i^2)$ is the complex circular independent and identical distributed (i.i.d.) additive Gaussian noise at user-i. At each receiver of a respective WD 22, a received message is decoded through successive interference cancellation (SIC).

The channel between the network node 16 and the user-i is a mmWave channel that suffers from strong penetration and reflection losses with little diffraction. This makes the mmWave channels sparse in the angular domain and highly correlated. The mmWave channel vector $h_{k,i}^H$ can be expressed as:

$$h_{k,i}^H = \sqrt{M} \frac{a(\theta_{k,i}^{(0)}) \alpha_{k,i}^{(0)}}{\sqrt{L}\left(1 + d_{k,i}^{\eta_{k,i}^{(0)}}\right)} + \sum_{l=1}^{L} \sqrt{M} \frac{a(\theta_{k,i}^{(l)}) \alpha_{k,i}^{(l)}}{\sqrt{L}\left(1 + d_{k,i}^{\eta_{k,i}^{(l)}}\right)}, \qquad (3)$$

where $\alpha_{k,i}^{(0)} \sim CN(0, \sigma_i^2)$ is the complex gain of the line of sight (LoS) component and $\eta_{k,i}^{(0)}$ is the path loss exponent for the LoS component. $d_{k,i}$ is the distance between the network node 16 and user-i. $a(\theta_{k,i}^{(0)})$ is the MX1 array steering vector of the LoS component and can be expressed as:

$$a(\theta_{k,i}) = \frac{1}{\sqrt{M}}\left[1, e^{-j2\pi \frac{D}{\lambda}\sin(\theta_{k,i})}, \ldots, e^{-j2\pi(M-1)\frac{D}{\lambda}\sin(\theta_{k,i})}\right]^T \qquad (4)$$

where $\lambda$ is the wavelength, $$D \leq \frac{\lambda}{2}$$

is the antenna spacing in the network node 16. $\theta_{k,i} \in [0, 2\pi]$ are the angles of departure (AoDs). Without loss of generality, assume $$\frac{D}{\lambda} = \frac{1}{2}.$$

The second term in (3) represents the non line of sight (NLoS) components where L is the total number of NLoS components.

A joint optimization problem may be formulated not only to determine the optimal user-to-cluster assignments, but also, to obtain the optimal number of clusters. In one formulation, different channel similarity measures for two different channel model assumptions are considered: single-path and general mmWave channels. The channel direction for single path and the normalized channel vectors for general mmWave channels may be used as channel information metrics. For the case of single-path mmWave channels, a cosine angle measure may be used as a similarity measure, which relies on the cosine of the angle between the channel vectors; a higher cosine value indicates that the channel vectors have higher similarity. For the case of general mmWave channels, Euclidean distance may be used as a similarity measure: shorter Euclidean distance indicates that the channel vectors have higher similarity.

The following discussion outlines the joint optimization solution for each of the two cases (single path and general mmWave channels).

Single-Path mmWave Channel Model Assumption:

$$\min \Sigma_{k=1}^{K} c_k$$

subject to:

$$\cos(h_i, h_j) \geq a_{ij} u_{ik} u_{jk}, \forall i,j,k, i=1,\ldots,N, j=1,\ldots,N, k=1,\ldots,N. \tag{C1}$$

$$\Sigma_{k=1}^{K} u_{ik} = 1, \forall i, i=1,\ldots,N \tag{C2}$$

$$\Sigma_{i=1}^{N} u_{ik} \leq T_k c_k, \forall k, k=1,\ldots,N \tag{C3}$$

$$u_{ik}, c_k \in \{0,1\}, \forall i,j,k, i=1,\ldots,N, k=1,\ldots,N, \tag{C4}$$

where $T_k$ is the maximum number of users that can be assigned to the k-th cluster, $a_{ij}$ is a predefined threshold value for cosine similarity between the channel vectors, and two following binary decision variables are used to describe the design objective and system constraints: $c_k$ and $u_{ik}$. The first, $c_k$, is 1 when the k-th cluster has at least one WD 22 and is 0 otherwise. The second, $u_{ik}$, is 1 when i-th WD 22 is assigned to the k-th cluster and is 0 otherwise.

The objective may be to minimize the number of the user clusters. This objective directly contributes to maximizing the number of users that can be served on the same wireless resource in in the ABF-based mm-Wave NOMA networks. Condition (C1) guarantees a certain level of channel correlation between the users within the clusters. Condition (C2) indicates that each user can be assigned to at most one cluster. Lastly, Condition (C3) implies that there can be at most $T_k$ number of users within the k-th cluster if the k-th cluster is not empty.

The formulation just given is a nonconvex integer nonlinear programming problem. To optimally solve this problem in a reasonable amount of time even with small number of instances is impracticable. Hence, the (C1) constraint is linearized as follows:

$$\cos(h_i, h_j) + S_1(2 - u_{ik} - u_{jk}) \geq a_{ij}, \forall i,j,k, i=1,\ldots,N, j=1,\ldots,N, k=1,\ldots,N,$$

where $S_1$ is a sufficiently large number and the cosine similarity metric in (C1) is defined as $$\cos(h_i, h_j) = \frac{|h_i^H h_j|}{\|h_i\|\|h_j\|}.$$

Note that if both binary decision variables, $c_k$ and $u_{ik}$, are equal to 1, then the constraint will be active. If one of the decision variables or both of $c_k$ and $u_{ik}$ are equal to zero, the constraint will be redundant. After this modification, the formulation becomes an integer linear programming problem. For instance, such a problem can be optimally solved by using a branch-and-bound-based CPLEX solver.

General mmWave Channel Model Assumption:

$$\min \Sigma_{k=1}^{K} c_k$$

subject to:

$$\text{dist}(x_i, x_j) u_{ik} u_{jk} \leq d_{ij}, \forall i,j,k, i=1,\ldots,N, j=1,\ldots,N, k=1,\ldots,N. \tag{C1}$$

$$\Sigma_{k=1}^{K} u_{ik} = 1, \forall i, i=1,\ldots,N \tag{C2}$$

$$\Sigma_{i=1}^{K} u_{ik} \leq T_k c_k, \forall k, k=1,\ldots,N \tag{C3}$$

$$u_{ik}, c_k \in \{0,1\}, \forall i,j,k, i=1,\ldots,N, k=1,\ldots,N, \tag{C4}$$

where $x_i$ is the normalized channel vector with $$x_i = \frac{h_i}{\|h_i\|}.$$

The given formulation above is a nonconvex integer nonlinear programming problem. Hence, the constraint (C1) is linearized as follows:

$$\text{dist}(x_i, x_j) \leq d_{ij} + S_2(2 - u_{ik} - u_{jk}), \forall i,j,k, i=1,\ldots,N, j=1,\ldots,N, k=1,\ldots,N,$$

where $S_2$ is a sufficiently large number and the Euclidean distance is defined as $\text{dist}(x_i, x_j) = \|x_i - x_j\|$. After this modification, the formulation becomes an integer linear programming problem, which can be solved as discussed above.

Thus, according to one aspect, a network node 16 configured to communicate with a plurality of wireless devices, WDs 22, via nonorthogonal multiple access (NOMA) is provided. The network node 16 includes processing circuitry 68 configured to: determine a minimum number of clusters to be served by the network node 16 subject to a first constraint that limits a total number of WDs 22 in each cluster. The processing circuitry 68 is also configured to assign WDs 22 to each cluster of the minimum number of clusters while or after the minimum number of clusters is determined, the determined minimum number of clusters and WD 22 assignments being for a first spatial distribution of the plurality of WDs 22.

According to this aspect, in some embodiments, determining the minimum number of clusters is further subject to a second constraint that includes a first WD 22 in a cluster based at least in part on a measure of channel similarity with other WDs 22 in the cluster. In some embodiments, the second constraint is linearized. In some embodiments, the measure of channel similarity is based at least in part on a gain of a line of sight, LOS, component of a channel vector of a channel between the network node 16 and the first WD 22. In some embodiments, the measure of channel similarity is a cosine similarity metric that is based at least in part on a normalized scalar product of channel vectors. In some embodiments, the measure of channel similarity associated with the first WD 22 is based at least in part on a magnitude of a difference between normalized channel vectors. In some embodiments, the first constraint is based at least in part on an upper limit on successive interference cancellation, SIC, iterations to be performed by at least one WD 22 in a cluster. In some embodiments, the processing circuitry 68 is further configured to: minimize, for each of a plurality of hypothetical spatial distributions of the plurality of WDs 22, a number of clusters to be served by the network node 16 subject to at least a third constraint that limits a total number of WDs 22 in each cluster; determine a model based at least in part on the first spatial distribution of the plurality of WDs 22 and the plurality of hypothetical spatial distributions of the plurality of WDs 22, the model configured to receive as inputs a set of WD 22 positions and to produce as outputs a minimum number of clusters and a set of WD 22 assignments for each cluster of the minimum number of clusters; and apply the model to a set of current WD positions of the plurality of WDs 22 to: determine a first minimum number of clusters for the set of current WD positions; and determine which WDs 22 are in each cluster in the determined first minimum number of clusters. In some embodiments, the determination of the model is made by a deep neural network that learns by offline processing to minimize a number of clusters for a given set of WDs 22 positions. In some embodiments, the processing circuitry 68 is further configured to allocate different resources to different clusters of the determined first minimum number of clusters.

According to another aspect, a method in a network node 16 configured to communicate with a plurality of wireless devices, WDs 22, via nonorthogonal multiple access (NOMA) is provided. The method includes determining a minimum number of clusters to be served by the network node 16 subject to a first constraint that limits a total number of WDs 22 in each cluster. The method also includes assigning WDs 22 to each cluster of the minimum number of clusters while or after the minimum number of clusters is determined, the determined minimum number of clusters and WD 22 assignments being for a first spatial distribution of the plurality of WDs 22.

According to this aspect, in some embodiments, determining the minimum number of clusters is further subject to a second constraint that includes a first WD 22 in a cluster based at least in part on a measure of channel similarity with other WDs 22 in the cluster. In some embodiments, the second constraint is linearized. In some embodiments, the measure of channel similarity is based at least in part on a gain of a line of sight, LOS, component of a channel vector of a channel between the network node 16 and the first WD 22. In some embodiments, the measure of channel similarity is a cosine similarity metric that is based at least in part on a normalized scalar product of channel vectors. In some embodiments, the measure of channel similarity associated with the first WD 22 is based at least in part on a magnitude of a difference between normalized channel vectors. In some embodiments, the first constraint is based at least in part on an upper limit on successive interference cancellation, SIC, iterations to be performed by at least one WD 22 in a cluster. In some embodiments, the method further includes minimizing, for each of a plurality of hypothetical spatial distributions of the plurality of WDs 22, a number of clusters to be served by the network node 16 subject to at least a third constraint that limits a total number of WDs 22 in each cluster. The method also includes determining a model based at least in part on the first spatial distribution of the plurality of WDs 22 and the plurality of hypothetical spatial distributions of the plurality of WDs 22, the model configured to receive as inputs a set of WD 22 positions and to produce as outputs a minimum number of clusters and a set of WD 22 assignments for each cluster of the minimum number of clusters. The method also includes applying the model to a set of current WD 22 positions of the plurality of WDs 22 to: determine a first minimum number of clusters for the set of current WD 22 positions; and determine which WDs 22 are in each cluster in the determined first minimum number of clusters. In some embodiments, the determination of the model is made by a deep neural network that learns by offline processing to minimize a number of clusters for a given set of WDs 22 positions. In some embodiments, the method further includes allocating different resources to different clusters of the determined first minimum number of clusters.

As will be appreciated by one of skill in the art, the concepts described herein may be embodied as a method, data processing system, and/or computer program product. Accordingly, the concepts described herein may take the form of an entirely hardware embodiment, an entirely software embodiment or an embodiment combining software and hardware aspects all generally referred to herein as a "circuit" or "module." Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks. It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A network node configured to communicate with a plurality of wireless devices, WDs, via nonorthogonal multiple access, NOMA, the network node comprising processing circuitry configured to:
    determine a minimum number of clusters to be served by the network node subject to a first constraint that limits a total number of WDs in each cluster; and
    assign WDs to each cluster of the minimum number of clusters while or after the minimum number of clusters is determined, the determined minimum number of clusters and WD assignments being for a first spatial distribution of the plurality of WDs.

2. The network node of claim 1, wherein determining the minimum number of clusters is further subject to a second constraint that includes a first WD in a cluster based at least in part on a measure of channel similarity with other WDs in the cluster.

3. The network node of claim 2, wherein the second constraint is linearized.

4. The network node of claim 2, wherein the measure of channel similarity is based at least in part on a gain of a line of sight, LOS, component of a channel vector of a channel between the network node and the first WD.

5. The network node of claim 2, wherein the measure of channel similarity is a cosine similarity metric that is based at least in part on a normalized scalar product of channel vectors.

6. The network node of claim 2, wherein the measure of channel similarity associated with the first WD is based at least in part on a magnitude of a difference between normalized channel vectors.

7. The network node of claim 1, wherein the first constraint is based at least in part on an upper limit on successive interference cancellation, SIC, iterations to be performed by at least one WD in a cluster.

8. The network node of claim 1, wherein the processing circuitry is further configured to:
    minimize, for each of a plurality of hypothetical spatial distributions of the plurality of WDs, a number of clusters to be served by the network node subject to at least a third constraint that limits a total number of WDs in each cluster;
    determine a model based at least in part on the first spatial distribution of the plurality of WDs and the plurality of hypothetical spatial distributions of the plurality of WDs, the model configured to receive as inputs a set of WD positions and to produce as outputs a minimum number of clusters and a set of WD assignments for each cluster of the minimum number of clusters; and
    apply the model to a set of current WD positions of the plurality of WDs to:
        determine a first minimum number of clusters for the set of current WD positions; and
        determine which WDs are in each cluster in the determined first minimum number of clusters.

9. The network node of claim 8, wherein the determination of the model is made by a deep neural network that learns by offline processing to minimize a number of clusters for a given set of WD positions.

10. The network node of claim 9, wherein the processing circuitry is further configured to allocate different resources to different clusters of the determined first minimum number of clusters.

11. A method in a network node configured to communicate with a plurality of wireless devices, WDs, via nonorthogonal multiple access, NOMA, the method comprising:
    determining a minimum number of clusters to be served by the network node subject to a first constraint that limits a total number of WDs in each cluster; and
    assigning WDs to each cluster of the minimum number of clusters while or after the minimum number of clusters is determined, the determined minimum number of clusters and WD assignments being for a first spatial distribution of the plurality of WDs.

12. The method of claim 11, wherein determining the minimum number of clusters is further subject to a second constraint that includes a first WD in a cluster based at least in part on a measure of channel similarity with other WDs in the cluster.

13. The method of claim 12, wherein the second constraint is linearized.

14. The method of claim 12, wherein the measure of channel similarity is based at least in part on a gain of a line of sight, LOS, component of a channel vector of a channel between the network node and the first WD.

15. The method of claim 12, wherein the measure of channel similarity is a cosine similarity metric that is based at least in part on a normalized scalar product of channel vectors.

16. The method of claim 12, wherein the measure of channel similarity associated with the first WD is based at least in part on a magnitude of a difference between normalized channel vectors.

17. The method of claim 11, wherein the first constraint is based at least in part on an upper limit on successive interference cancellation, SIC, iterations to be performed by at least one WD in a cluster.

18. The method of claim 11, further comprising:
    minimizing, for each of a plurality of hypothetical spatial distributions of the plurality of WDs, a number of clusters to be served by the network node subject to at least a third constraint that limits a total number of WDs in each cluster;

determine a model based at least in part on the first spatial distribution of the plurality of WDs and the plurality of hypothetical spatial distributions of the plurality of WDs, the model configured to receive as inputs a set of WD positions and to produce as outputs a minimum number of clusters and a set of WD assignments for each cluster of the minimum number of clusters; and applying the model to a set of current WD positions of the plurality of WDs to:
  determine a first minimum number of clusters for the set of current WD positions; and
  determine which WDs are in each cluster in the determined first minimum number of clusters.

19. The method of claim 18, wherein the determination of the model is made by a deep neural network that learns by offline processing to minimize a number of clusters for a given set of WD positions.

20. The method of claim 19, further comprising allocating different resources to different clusters of the determined first minimum number of clusters.

* * * * *